United States Patent
O'Shea

(10) Patent No.: US 7,580,390 B2
(45) Date of Patent: Aug. 25, 2009

(54) REDUCING HANDOVER FREQUENCY ERROR

(75) Inventor: Helena O'Shea, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 222 days.

(21) Appl. No.: 09/995,235

(22) Filed: Nov. 26, 2001

(65) Prior Publication Data

US 2003/0099215 A1    May 29, 2003

(51) Int. Cl.
*H04W 4/00* (2006.01)
(52) U.S. Cl. .............. 370/331; 370/332; 370/333; 375/136; 375/137; 375/147; 375/344; 455/436; 455/437; 455/438; 455/439; 455/440; 455/196.1; 455/442
(58) Field of Classification Search ............ 370/331, 370/335, 337, 343, 350, 441, 442, 320, 222, 370/332, 333; 455/436–440, 442, 447, 196.1; 375/136, 137, 147, 344
See application file for complete search history.

(56) References Cited

U.S. PATENT DOCUMENTS

| | | | | |
|---|---|---|---|---|
| 5,276,706 A | * | 1/1994 | Critchlow | 375/343 |
| 5,432,819 A | * | 7/1995 | Mui | 375/329 |
| 5,691,974 A | * | 11/1997 | Zehavi et al. | 370/203 |
| 5,784,695 A | * | 7/1998 | Upton et al. | 455/442 |
| 6,078,570 A | * | 6/2000 | Czaja et al. | 370/331 |
| 6,278,725 B1 | * | 8/2001 | Rouphael et al. | 375/148 |
| 6,463,266 B1 | * | 10/2002 | Shohara | 455/196.1 |
| 6,546,252 B1 | * | 4/2003 | Jetzek et al. | 455/437 |
| 6,564,067 B1 | * | 5/2003 | Agin | 455/522 |

(Continued)

FOREIGN PATENT DOCUMENTS

EP    0665659    1/1995

(Continued)

OTHER PUBLICATIONS

International Search Report—PCT/US02/037427, International Search Authority—European Patent Office—Apr. 4, 2003.

(Continued)

*Primary Examiner*—William Trost, IV
*Assistant Examiner*—Toan D Nguyen
(74) *Attorney, Agent, or Firm*—Howard H. Seo; Darren M. Simon

(57) ABSTRACT

Frequency estimation information obtained when a wireless communication device (WCD) is in one wireless communication system, such as frequency error or offset information, may be translated to a corresponding frequency error in another system, thereby allowing the WCD to perform a handover to the other system with reduced initial frequency error. As a result, the acquisition time involved in acquiring a signal in the other system may be significantly reduced.

22 Claims, 5 Drawing Sheets

U.S. PATENT DOCUMENTS

| | | | |
|---|---|---|---|
| 6,567,666 B2 * | 5/2003 | Czaja et al. | 455/442 |
| 6,584,090 B1 * | 6/2003 | Abdelgany et al. | 370/342 |
| 6,587,446 B2 * | 7/2003 | Sakar et al. | 370/331 |
| 6,760,599 B1 * | 7/2004 | Uhlik | 455/525 |
| 6,775,261 B1 * | 8/2004 | Banister | 370/344 |
| 6,845,238 B1 * | 1/2005 | Muller | 455/436 |
| 6,956,895 B2 * | 10/2005 | Vihriala | 375/148 |
| 6,996,158 B2 * | 2/2006 | Bradley | 375/148 |
| 7,027,535 B1 * | 4/2006 | Aftelak | 375/344 |

FOREIGN PATENT DOCUMENTS

| | | |
|---|---|---|
| EP | 1104974 | 11/2000 |
| EP | 1126637 A2 * | 8/2001 |
| WO | 0057601 | 9/2000 |
| WO | 0154442 | 1/2001 |
| WO | 0178322 | 10/2001 |

OTHER PUBLICATIONS

International Preliminary Examination Report—PCT/US02/037427, IPEA/US—Aug. 12, 2004.

Garcia-Luna-Aceves, J.J., et al, "A Multicast Routing Protocol for Ad-Hoc Networks," Infocom '99, 18th Annual Joint Conference of the IEEE Computer and Communications Societies, Proceedings, vol. 2, pp. 784-792, Mar. 21-25, 1999.

* cited by examiner

REDUCING HANDOVER FREQUENCY ERROR

FIELD

The invention relates to wireless communications and, more particularly, to frequency tracking in a wireless communication system.

BACKGROUND

Wireless communication systems are widely deployed to provide various types of communication, such as voice and data communications. These systems may be based on a variety of modulation techniques, such as frequency division multiple access (FDMA), time division multiple access (TDMA), and various spread spectrum techniques. One common spread spectrum technique used in wireless communications is code division multiple access (CDMA) signal modulation. In CDMA, multiple communications are simultaneously transmitted over a spread spectrum radio frequency (RF) signal. Some example wireless communication devices (WCDs) that have incorporated CDMA technology include cellular radiotelephones, PCMCIA cards incorporated within portable computers, personal digital assistants (PDAs) equipped with wireless communication capabilities, and the like. A CDMA system provides certain advantages over other types of systems, including increased system capacity.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in a set of documents including "C.S0002-A Physical Layer Standard for cdma2000 Spread Spectrum Systems," the "C.S0005-A Upper Layer (Layer 3) Signaling Standard for cdma2000 Spread Spectrum Systems," and the "C.S0024 cdma2000 High Rate Packet Data Air Interface Specification" (the cdma2000 standard), and (4) some other standards.

Other wireless communication systems may use different modulation techniques. For example, GSM systems use a combination of TDMA and FDMA modulation techniques. These techniques are also used in other systems related to GSM systems, including the DCS1800 and PCS1900 systems, which operate at 1.8 GHz and 1.9 GHz, respectively.

Some communication systems are not yet widely deployed. For example, costs associated with deploying W-CDMA systems have generally limited the coverage of such systems to large cities. For such systems, it is desirable to use a secondary communication system to provide coverage in areas in which there is no W-CDMA coverage. For instance, W-CDMA systems often use a network of GSM carriers to fill in gaps in coverage areas. Other systems may use different secondary communication systems, such as IS-95 networks.

When a WCD is in a W-CDMA call and the W-CDMA signal becomes weak, the WCD may perform a handover to a GSM carrier. For example, a handover from WCDMA to GSM typically occurs when the WCD leaves an area with W-CDMA coverage. The handover decision may be based on a number of handover measurements, including, for example, received signal code power (RSCP), signal-to-interference ratio (SIR), or a received signal strength indicator (RSSI). The WCD may perform handover measurements in a compressed mode in which the downlink transmission contains breaks. During these breaks, the WCD may monitor one or more GSM carriers by obtaining GSM signal strength measurements. Under appropriate circumstances, the WCD switches the call to a selected GSM carrier until the WCD enters an area with WCDMA coverage, at which point the WCD switches the call back to the W-CDMA system.

In CDMA, GSM, and other wireless communication technologies, frequency tracking loops are often used to monitor the frequency of received signals and adjust the signals accordingly. In particular, frequency errors or variations often exist in the carrier signals received over forward or reverse links of the system. A forward link, sometimes referred to as a downlink, refers to a signal sent from the base station to a wireless communication device. A reverse link, sometimes referred to as an uplink, refers to a signal sent from the WCD to the base station.

There are generally two main causes of the errors that can contribute to unwanted frequency variation of a carrier signal. One relates to what is commonly known as the Doppler effect or Doppler shift. The Doppler effect manifests as a change in the frequency of a received signal due to a relative velocity between the transmitter and the receiver. For example, if a WCD is moving away from the base station as it transmits a signal over the reverse link, the base station receiver will receive a signal that has a lower frequency, i.e., a longer wavelength, than the transmitted signal. Conversely, if the WCD is moving toward the base station as it transmits, the base station receiver will receive a signal that has a higher frequency, i.e., a shorter wavelength, than the transmitted signal. Because WCDs are often used within vehicles or high speed transit systems, correcting for Doppler shifts can be an extremely important factor in maintaining a robust and effective wireless communication system.

Another cause of error that can contribute to unwanted frequency variation relates to variations between local clocks of the various devices in the wireless communication system. Each device in the system typically produces carrier signals using a frequency synthesizer that uses the local clock of the device as its timing device. Each local clock, however, typically has an unknown timing error. WCDs often employ relatively low-cost local clocks, such as voltage-controlled, temperature-compensated crystal oscillators (VCTCXOs). These local clocks can introduce significant frequency errors in the carrier signal.

Frequency tracking loops correct for frequency errors by estimating the frequency errors and adjusting the frequency of received signals. For example, a frequency discriminator can be used to compute an estimate of the frequency error. The frequency discriminator calculates residual frequency errors and continuously accumulates the residual frequency errors to estimate the actual frequency error. A rotator then uses the accumulated estimate to adjust the frequency of the received signal accordingly, thus reducing the residual frequency error. The residual frequency error eventually converges to approximately zero, such that the accumulated estimate is approximately equal to the actual frequency error. In this manner, a feedback loop can correct for frequency errors in a received carrier signal.

SUMMARY

In general, the invention facilitates reducing frequency errors during transitions between wireless communication systems by using frequency estimation information from one system, e.g., a W-CDMA system, when transitioning to another system, such as a GSM system. For example, in some embodiments, frequency error or offset information obtained when a WCD is in the W-CDMA system is translated into a corresponding frequency error in the GSM system, thereby allowing the WCD to operate in the GSM mode with reduced frequency error during initial iterations of the frequency tracking loop.

The invention may offer a number of advantages. By reducing frequency errors during the initial iterations of the frequency tracking loop, convergence to the correct error correction value can be achieved more quickly. With the frequency estimation information in the W-CDMA system used in transitioning to the GSM system, for example, the frequency error between a W-CDMA base station and a GSM base station may be reduced to the relative frequency drift between the two base stations. As a result, acquisition time in the GSM system may be significantly reduced. Further, GSM operations may be simplified by avoiding some of the processes that might otherwise be involved in acquiring a GSM signal. In addition, the frequency estimation results reported by the GSM receiver to the W-CDMA base station may be made more reliable, thereby improving call quality.

In one embodiment, the invention is directed to a frequency tracking method. Frequency estimation information is obtained from a first wireless signal received from a first carrier. A handover to a second carrier is performed in which the frequency information is used to configure a frequency tracking loop for receiving a second wireless signal from the second carrier.

The invention may be implemented in software, hardware, firmware, or any combination thereof. If implemented in software, the invention may be directed to a computer readable medium carrying program code, that when executed, performs one or more of the methods mentioned above.

An example hardware embodiment is an apparatus that includes a first receiver to receive a first signal from a first carrier. The first receiver includes a first frequency tracking loop to obtain frequency estimation information relating to the first signal. A second receiver receives a second signal from a second carrier. The second receiver comprising a second frequency tracking loop to obtain frequency estimation information relating to the second signal as a function of the frequency estimation information relating to the first signal.

Additional details of various embodiments are set forth in the accompanying drawings and the description below. Other features, objects and advantages will become apparent from the description and drawings, and from the claims.

DETAILED DESCRIPTION

In the description below, various embodiments of the invention are described in the context of a wireless signal transmitted over a forward link, such as from a base station to a wireless communication device (WCD). The invention may involve frequency tracking of signals received by the WCD.

Figure 1:
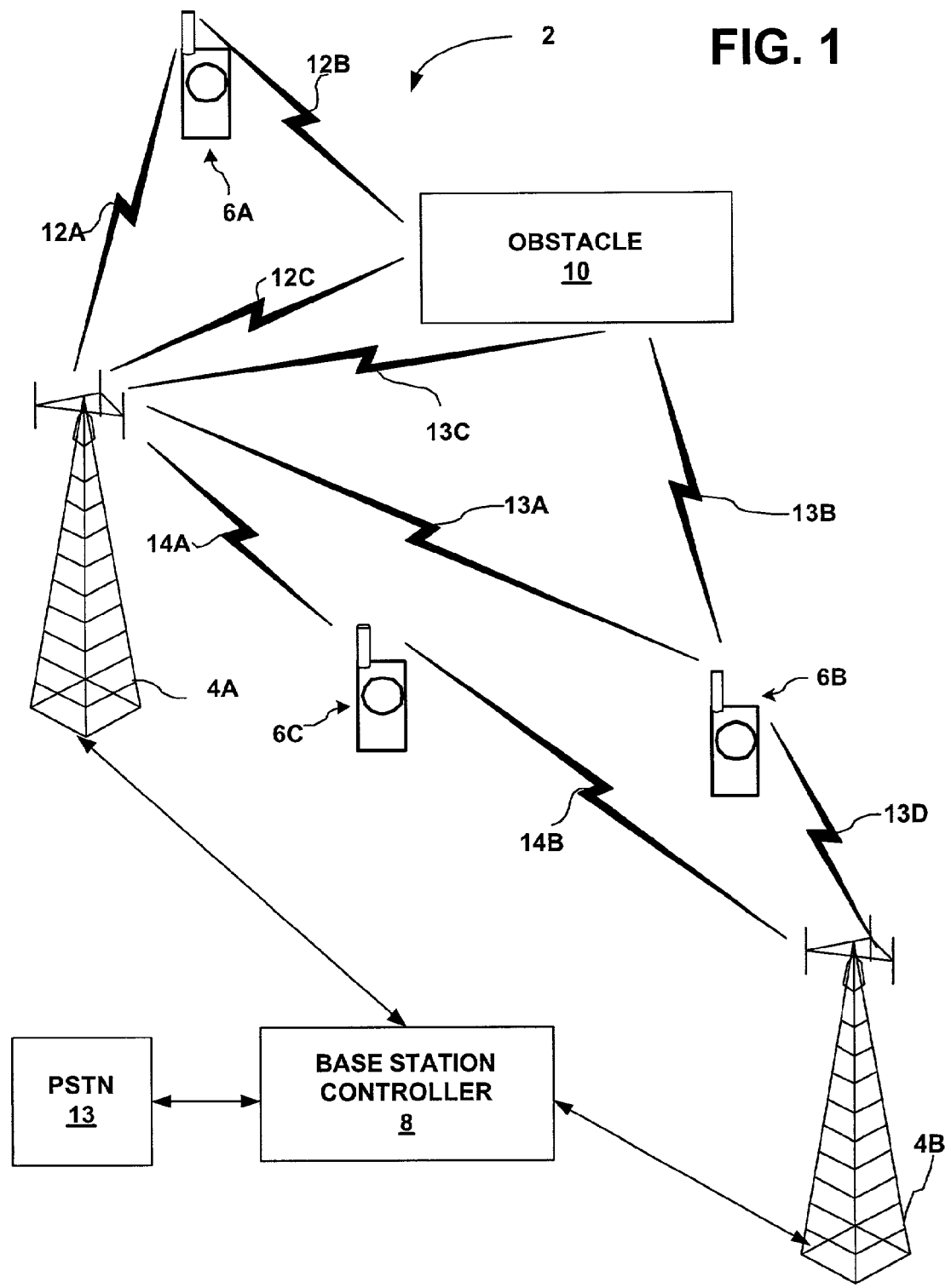
FIG. 1 is a block diagram illustrating a wireless communication system according to the invention.

FIG. 1 is a block diagram illustrating an example spread spectrum wireless communication system 2, in which base stations 4 transmit signals 12-14 to WCDs 6 via one or more paths. In particular, base station 4A transmits signal 12A to WCD 6A via a first path, as well as signal 12C, via a second path caused by reflection of signal 12B from obstacle 10. Obstacle 10 may be any structure proximate to WCD 6A such as a building, bridge, car, or even a person.

Base station 4A also transmits signal 13A to WCD 6B via a first path from base station 4A, as well as signal 13C via a second path caused by reflection of signal 13B from obstacle 10. In addition, base station 4A transmits signal 14A to WCD 6C. WCDs 6 may implement what is referred to as a RAKE receiver to simultaneously track the different signals received from different base stations and/or from the same base station but via different paths. System 2 may include any number of WCDs and base stations. For example, as illustrated, another base station 4B receives signal 13D from WCD 6B. In addition, base station 4B receives signal 14B from WCD 6C.

System 2 may be designed to support one or more CDMA standards including, for example, (1) the "TIA/EIA-95-B Mobile Station-Base Station Compatibility Standard for Dual-Mode Wideband Spread Spectrum Cellular System" (the IS-95 standard), (2) the "TIA/EIA-98-C Recommended Minimum Standard for Dual-Mode Wideband Spread Spectrum Cellular Mobile Station" (the IS-98 standard), (3) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (4) the standard offered by a consortium named "3rd Generation Partnership Project 2" (3GPP2) and embodied in a set of documents including "TR-45.5 Physical Layer Standard for cdma2000 Spread Spectrum Systems," the "C.S0005-A Upper Layer (Layer 3) Signaling Standard for cdma2000 Spread Spectrum Systems," and the "C.S0024 CDMA2000 High Rate Packet Data Air Interface Specification" (the CDMA2000 standard), (5) the HDR system documented in TIA/EIA-IS-856, "CDMA2000 High Rate Packet Data Air Interface Specification, and (6) some other standards. In addition, system 2 may be designed to support other standards, such as the GSM standard or related standards, e.g., the DCS1800 and PCS1900 standards. GSM systems employ a combination of FDMA and TDMA modulation techniques. System 2 may also support other FDMA and TDMA standards.

The various base stations in system 2 may each support different standards. For example, base station 4A may transmit signals according to the W-CDMA standard, while base station 4B may transmit signals according to the GSM standard. Some base stations may support multiple standards. For instance, base station 4A may support both the W-CDMA and GSM standards, as well as other standards, such as the IS-95 standard. As described above, costs associated with implementing W-CDMA have generally limited W-CDMA coverage to large cities. Thus, a typical system 2 has a greater coverage area for GSM carriers than for W-CDMA carriers. Accordingly, system 2 may use GSM carriers to provide coverage in areas that lack W-CDMA coverage.

For example, when WCD 6A is in a W-CDMA call, WCD 6A may obtain measurements of W-CDMA signal strength from base station 4A, as well as of GSM signal strength from base station 4B. WCD 6A may perform the GSM signal strength measurements during breaks in the downlink transmission in compressed mode. The measurements may include, for example, received signal code power (RSCP), signal-to-interference ratio (SIR), or a received signal strength indicator (RSSI).

When these handover measurements indicate that WCD 6A is leaving the coverage area of base station 4A, WCD 6A may perform a handover to a GSM carrier, e.g., to base station 4B. WCD 6A may subsequently perform another handover when WCD 6A enters the coverage area of a base station that supports W-CDMA.

When WCD 6A performs a handover from a W-CDMA carrier to a GSM carrier, a significant frequency error may be present on the GSM signal. According to various embodiments of the invention, WCD 6A applies frequency estimation information, e.g., frequency error information, obtained in the W-CDMA mode when WCD 6A switches to GSM mode, thereby allowing WCD 6A to operate in the GSM mode with reduced frequency error immediately after the handoff. In other words, the residual frequency error in the frequency tracking loop in the receiver of WCD 6A does not start at zero. Rather, the residual error has an initial value so that the frequency tracking loop will converge to the correct frequency error correction value more quickly. As a result, acquisition time in the GSM system may be significantly reduced. In addition, frequency estimation results reported by the GSM receiver to the W-CDMA base station may be made more reliable, thereby improving call quality.

WCDs 6 may be implemented as any of a variety of wireless communication devices, such as, for example, a cellular radiotelephone, a satellite radiotelephone, a PCMCIA card incorporated within a portable computer, a personal digital assistant (PDA) equipped with wireless communication capabilities, and the like. Base stations 4 (sometimes referred to as base transceiver systems, or BTSs) are typically connected to a base station controller (BSC) 8 to provide an interface between base stations 4 and a public switched telephone network 13.

Figure 2:
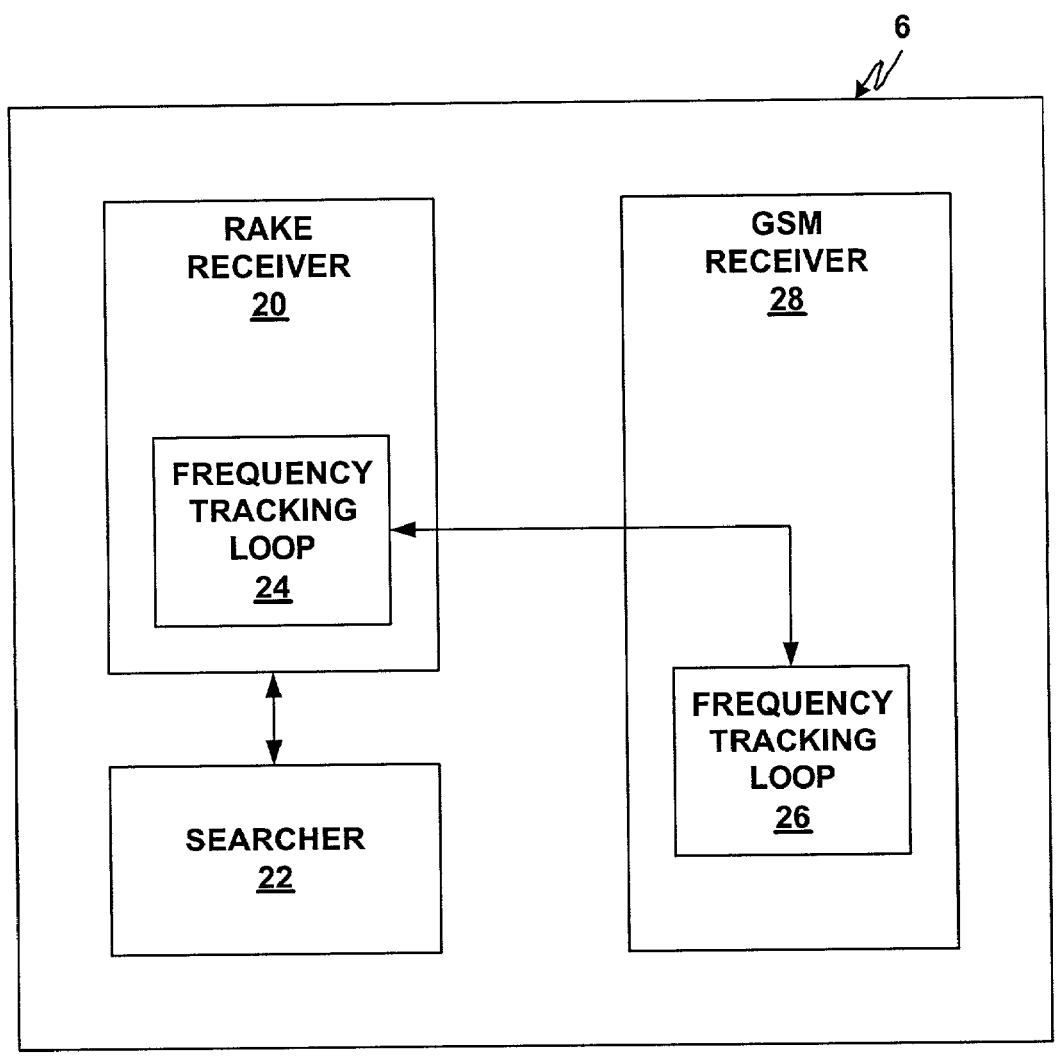
FIG. 2 is a block diagram depicting an example implementation of a WCD, according to an embodiment of the invention.

FIG. 2 is a block diagram depicting an example implementation of WCD 6, according to an embodiment of the invention. WCD 6 is designed to support multiple wireless standards or designs, including, for example, the GSM and W-CDMA standards. A RAKE receiver 20 and a searcher 22 are used to receive and transmit signals according to the W-CDMA standard. RAKE receiver 20 incorporates a frequency tracking loop 24 that estimates frequency error and adjusts the signal frequency of W-CDMA signals received by WCD 6. In some embodiments, frequency tracking information, e.g., the estimated frequency offset, is provided to a frequency tracking loop 26 in a GSM receiver 28 to adjust the signal frequency of GSM signals received by GSM receiver 28 when WCD 6 performs a handover from a W-CDMA carrier to a GSM carrier.

As described below in connection with FIG. 4, various aspects of the invention may be implemented in frequency tracking loop that incorporates rotators in a number of demodulation fingers, as well as a voltage-controlled, temperature-compensated crystal oscillator (VCTCXO). The estimated frequency offset is applied to the VCTCXO, which adjusts received signals according to the estimated frequency offset, and may also be applied to the rotators in each demodulation finger.

Figure 3:
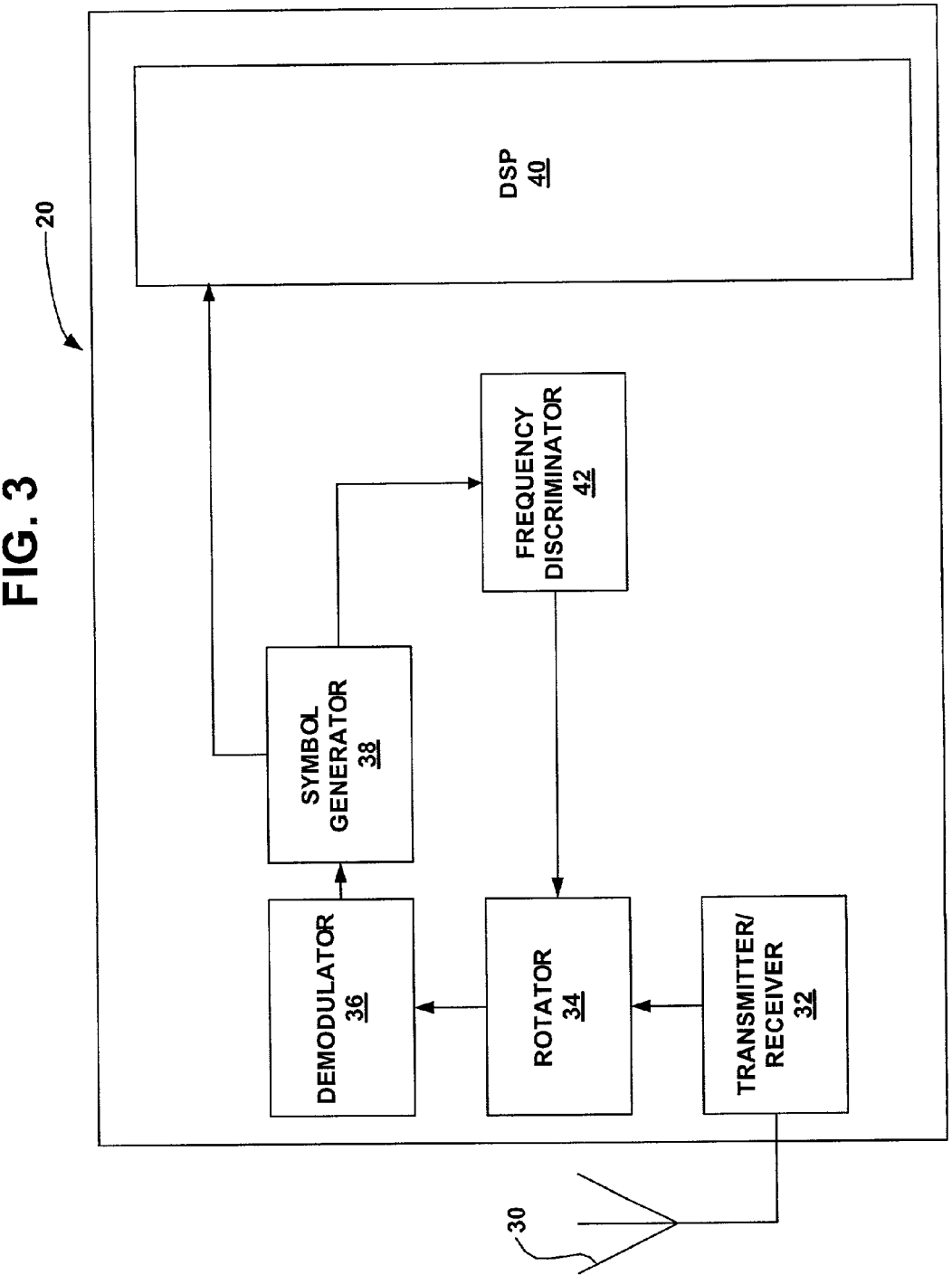
FIG. 3 is a block diagram illustrating example hardware for implementing a frequency tracking technique, according to an embodiment of the invention.

FIG. 3 is a block diagram illustrating example hardware for implementing various aspects of the invention. The hardware of FIG. 3 is described as forming part of RAKE receiver 20 of FIG. 2 to estimate frequency error and adjust the signal frequency of signals received by WCD 6. As shown in FIG. 3, hardware of WCD 6 may include a transmitter/receiver (transceiver) 32 coupled to an antenna 30. When antenna 30 receives an incoming RF signal, transceiver 32 conditions the received signal and passes the conditioned signal to a rotator 34. Conditioning the received signal may involve, for example, filtering, amplifying, and digitizing the received signal. Rotator 34 then adjusts the frequency of the signal to account for frequency errors caused, for example, by variations in local clocks and Doppler shifts. Rotator 34 forms part of a frequency tracking loop and uses an estimated frequency error to adjust received signals accordingly.

After rotator 34 adjusts the frequency of the received signal, the signal is sent to a demodulator 36. Demodulator 36 demodulates individual chips of the signal, e.g., by despreading PN codes and decovering orthogonal codes for each chip. Demodulation results are then grouped into control symbols by a symbol generator 38, which then passes the control symbols to a digital signal processor (DSP) 40 for symbol demodulation and data recovery.

The control symbols are also sent to a frequency discriminator 42, which estimates the error associated with the received signal using the control symbols. For example, frequency discriminator 42 may estimate the residual frequency error by cross-multiplying and accumulating symbols or sets of symbols to determine the phase difference between successive symbols.

Frequency discriminator 42 may issue a command to rotator 34 to adjust the frequency of the received signal according to an appropriate frequency offset. Alternately, rotator 34 may access frequency discriminator 42 to obtain the proper frequency adjustment. In either case, the frequency offset is also provided to frequency tracking loop 26 of FIG. 2. In addition, a voltage-controlled, temperature-compensated oscillator (VCTCXO) may also use the frequency offset to adjust the frequency of received signals, as described below in connection with FIG. 4. When WCD 6 performs a W-CDMA to GSM handover, frequency tracking loop 26 adjusts the frequency of a received GSM signal according to the frequency offset obtained in the W-CDMA mode.

Figure 4:
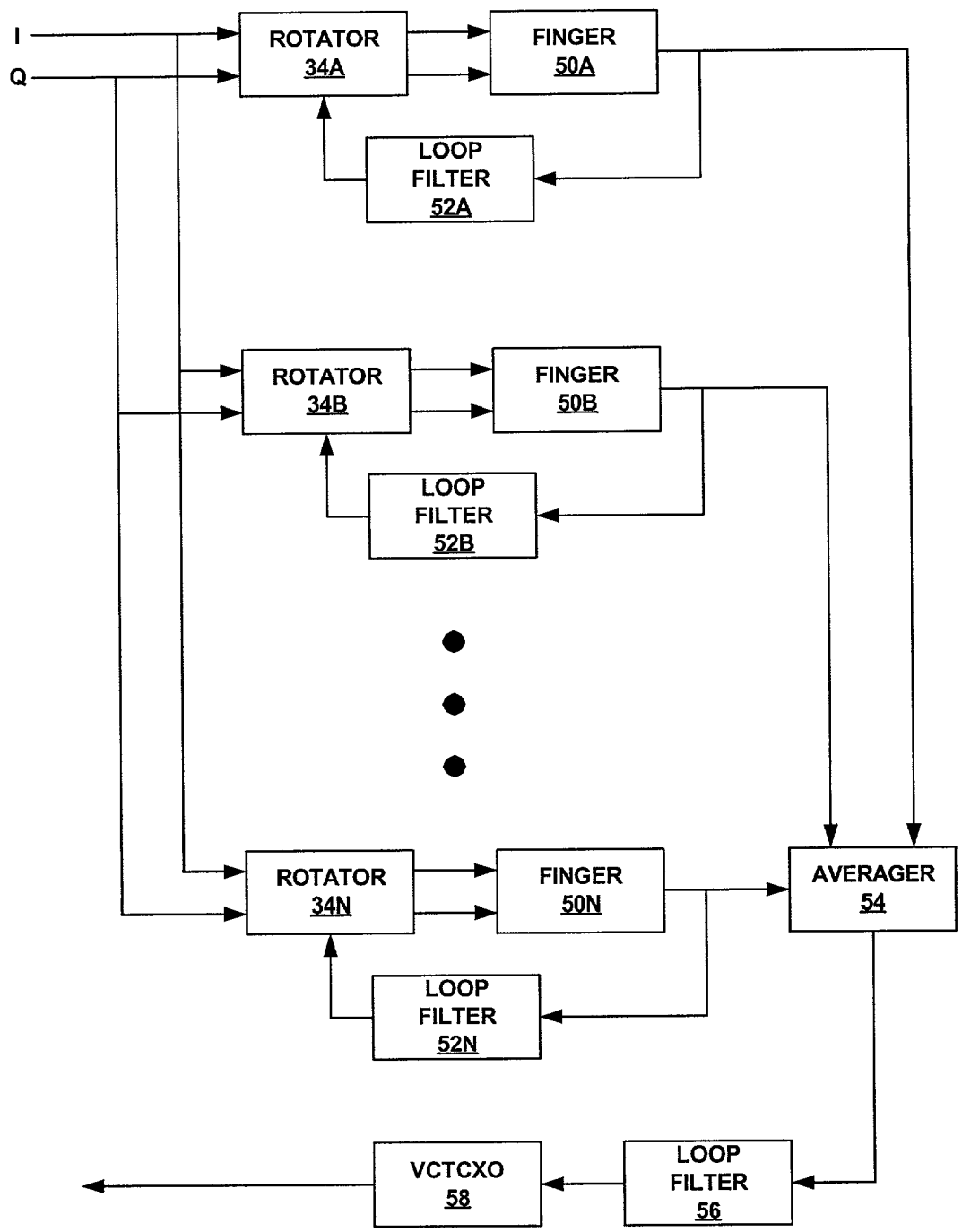
FIG. 4 is a block diagram illustrating example hardware for implementing various aspects of the invention within a RAKE receiver.

FIG. 4 is a block diagram illustrating a portion of the hardware of WCD 6, according to another embodiment of the invention. In particular, FIG. 4 illustrates hardware that forms part of a RAKE receiver that includes a number of "fingers" 50 to track different signal paths. The different paths tracked by fingers 50 of the RAKE receiver may correspond to the signals sent from different sources, or a signal sent from the same source but having been reflected from one or more objects, i.e., a multi-path signal. Each finger 50 may include a demodulator, a symbol generator, and a frequency discriminator for extracting symbols from each signal path. In addition, each finger 50 is associated with a rotator 34 and a loop filter 52. For each finger 50, the associated loop filter 52 estimates frequency offsets and causes the associated rotator 34 to adjust the frequency of received in-phase (I) and quadrature (Q) baseband signals. The frequency offsets are provided to an averager 54 and a loop filter 56 to provide a weighted average frequency offset to a VCTCXO 58.

Figure 5:
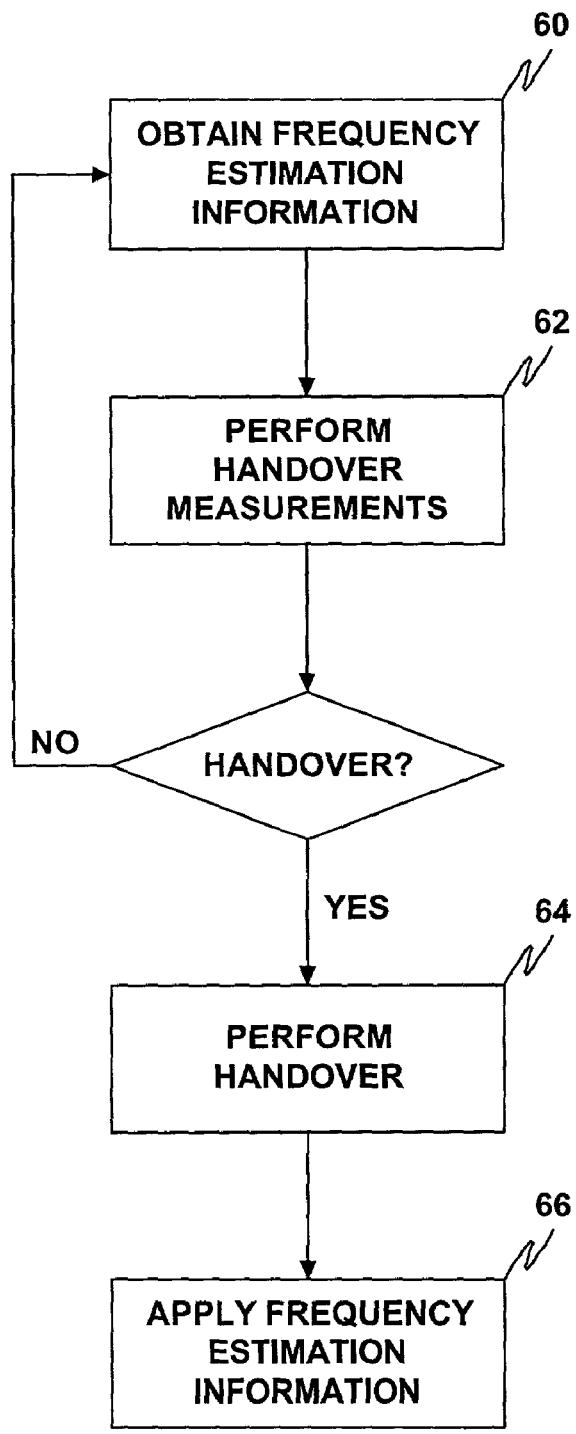
FIG. 5 is a flow diagram illustrating an example frequency tracking technique, according to another implementation of the invention.

FIG. 5 is a flow diagram depicting an example frequency tracking technique that may be implemented by WCD 6. During a W-CDMA call, WCD 6 obtains frequency estimation information (60), such as frequency offset estimations. This frequency estimation information may originate from various demodulation components, such as RAKE receiver 20 of FIG. 2, and are tightly tuned. For example, fingers 50 of the RAKE receiver of FIG. 4 may generate frequency offsets that are used by the respective rotators 34A-34N for frequency adjustments. In addition, VCTCXO 58 may perform frequency adjustments as a function of the weighted average of the frequency offsets from fingers 50.

In addition to obtaining frequency-offset estimations, WCD 6 also performs handover measurements (62) for available GSM carriers. WCD 6 may perform these measurements during breaks in the downlink transmission in compressed mode. The measurements may include, for example, received signal code power (RSCP), signal-to-interference ratio (SIR), or a received signal strength indicator (RSSI). Performing handover measurements in the compressed mode allows WCD 6 to obtain measurements for a GSM system while maintaining a call in the W-CDMA system.

WCD 6 uses the handover measurements to determine when a W-CDMA to GSM handover should be made, e.g., when the received W-CDMA signal is weak, indicating that WCD 6 is leaving an area with W-CDMA coverage. When WCD 6 does perform a handover (64), WCD 6 also uses the handover measurements to select a particular GSM carrier, if multiple GSM carriers are available.

Using conventional handover techniques, a handover may result in significant initial frequency errors present on the GSM signal and potential performance degradation. For example, the acquisition time involved in acquiring the GSM signal may be significantly increased. By contrast, according to the principles of the invention, WCD 6 applies the frequency estimation information, e.g., the estimated frequency offset, obtained in the W-CDMA mode when performing the handover (66). In particular, the estimated frequency offset is translated to an equivalent frequency error in the GSM band and applied to the VCTCXO, to one or more rotators, or both to adjust the frequency of the received GSM signal. This translation may be achieved by first calculating the current frequency offset being applied in the W-CDMA system as a ratio of the ideal carrier frequency to the current frequency of operation and then using this ratio to convert the frequency offset for W-CDMA to the frequency offset for GSM. In addition, frequency corrections applied in W-CDMA due to slowly varying Doppler effects can be translated to the frequency correction to be applied in GSM.

By applying the estimated frequency offset obtained in the W-CDMA mode to the GSM mode, the frequency error between the W-CDMA and GSM base stations may be reduced to the relative frequency drift between two base stations. As a result, the acquisition time involved in converging to the correct frequency offset in the GSM mode may be decreased significantly.

When WCD 6 enters an area that has W-CDMA coverage, WCD 6 may perform a GSM to W-CDMA handover. Frequency estimation information may be applied to improve the reliability of results provided from GSM receiver 28 to the W-CDMA base station, thereby improving call quality.

If the invention is implemented in program code, the processor that executes the program code may take the form of a microprocessor and can be integrated with or form part of a wireless-enabled computer, a WCD, or the like. The memory may include random access memory (RAM) storing program code that is accessed and executed by a processor to carry out the various techniques described above.

Example hardware implementations may include implementations within a DSP, an application specific integrated circuit (ASIC), a field programmable gate array (FPGA), a programmable logic device, specifically designed hardware components, or any combination thereof.

In addition, various other modifications may be made without departing from the spirit and scope of the invention. For example, various other components such as digital filters can be implemented within the frequency tracking loop to improve performance. Further, while several embodiments have been described in the context of W-CDMA to GSM handovers, the principles of the invention can also be applied to GSM to W-CDMA handovers. The principles of the invention may also be applied to handovers between CDMA2000 and GSM systems. More generally, the invention may be implemented in handoffs from any system to any other system, such as a handoff between CDMA and TDMA systems, between CDMA and FDMA systems, between FDMA and TDMA systems, or between GSM and FDMA systems. Accordingly, these and other embodiments are within the scope of the following claims.

The invention claimed is:

1. A method comprising:
   obtaining frequency estimation information from a first wireless signal received from a first carrier in a first communication system;
   performing a handover to a second carrier in a second communication system distinct from the first communication system; and
   configuring a frequency tracking loop for receiving a second wireless signal from the second carrier as a function of the frequency estimation information;
   wherein the frequency estimation information comprises a frequency offset for the first wireless signal; and
   wherein configuring the frequency tracking loop includes:
      calculating a ratio of an ideal frequency of the first carrier to an actual frequency of the first wireless signal received from the first carrier, and
      using the frequency ratio to convert the frequency offset for the first wireless signal to a frequency offset for the second wireless signal.

2. The method of claim 1, wherein the first wireless signal is a CDMA signal and the second wireless signal is a GSM signal.

3. The method of claim 2, wherein the CDMA signal is one of a W-CDMA signal and a CDMA2000 signal.

4. The method of claim 1, wherein the first wireless signal is a GSM signal and the second wireless signal is a CDMA signal.

5. The method of claim 1, wherein the frequency tracking loop configures a voltage-controlled, temperature-compensated oscillator as a function of the frequency estimation information.

6. The method of claim 1, wherein the frequency tracking loop configures a rotator as a function of the frequency estimation information.

7. The method of claim 1, further comprising obtaining handover information during an allocated time slot.

8. The method of claim 7, wherein the handover information comprises at least one of received signal code power (RSCP), signal-to-interference ratio (SIR), and a received signal strength indicator (RSSI).

9. The method of claim 7, wherein the allocated time slot occurs during a compressed mode.

10. An apparatus comprising:
    means for obtaining frequency estimation information from a first wireless signal received from a first carrier in a first communication system;

means for performing a handover to a second carrier in a second communication system distinct from the first communication system; and means for configuring a frequency tracking loop for receiving a second wireless signal from the second carrier as a function of the frequency estimation information; wherein the frequency estimation information comprises a frequency offset for the first wireless signal; and wherein configuring the frequency tracking loop includes calculating ratio of an ideal frequency of the first carrier to an actual frequency of the first wireless signal received from the first carrier, and using said frequency ratio to convert the frequency offset for the first wireless signal to a frequency offset for the second wireless signal.

11. The apparatus of claim 10, wherein the first wireless signal is a CDMA signal and the second wireless signal is a GSM signal.

12. The apparatus of claim 11, wherein the CDMA signal is one of a W-CDMA signal and a CDMA2000 signal.

13. The apparatus of claim 10, wherein the first wireless signal is a GSM signal and the second wireless signal is a CDMA signal.

14. The apparatus of claim 10, wherein the frequency tracking loop configures a voltage-controlled, temperature-compensated oscillator as a function of the frequency estimation information.

15. The apparatus of claim 10, wherein the frequency tracking loop configures a rotator as a function of the frequency estimation information.

16. The apparatus of claim 10, further comprising means for obtaining handover information during an allocated time slot.

17. The apparatus of claim 16, wherein the handover information comprises at least one of received signal code power (RSCP), signal-to-interference ratio (SIR), and a received signal strength indicator (RSSI).

18. The apparatus of claim 16, wherein the allocated time slot occurs during a compressed mode.

19. A method comprising:

determining a frequency error of a first wireless signal operating at a first carrier frequency;

configuring a frequency tracking loop for receiving a second wireless signal operating at a second carrier based at least in part on the frequency error of the first wireless signal;

wherein configuring the frequency tracking loop includes:

calculating a ratio of an ideal frequency of the first carrier to an actual frequency of the first wireless signal received from the first carrier, and using said frequency ratio to convert the frequency error for the first wireless signal to a frequency offset for the second wireless signal; and performing a handover to the second carrier.

20. The method of claim 19, wherein determining the frequency error comprises averaging a frequency offset from a plurality of fingers of a RAKE receiver.

21. The method of claim 19, wherein determining the frequency error comprises determining a frequency offset of a carrier frequency of the first wireless signal relative to a desired carrier frequency.

22. The method of claim 19, wherein configuring the frequency tracking loop comprises:

determining a ratio of a desired carrier frequency to a carrier frequency of the first wireless signal relative; and applying a frequency correction to the frequency tracking loop based on the ratio.

* * * * *